United States Patent [19]

Cassetti et al.

[11] Patent Number: 5,752,262
[45] Date of Patent: May 12, 1998

[54] SYSTEM AND METHOD FOR ENABLING AND DISABLING WRITEBACK CACHE

[75] Inventors: David K. Cassetti, Tempe; Philip Wszolek, Phoenix, both of Ariz.

[73] Assignee: VLSI Technology, San Jose, Calif.

[21] Appl. No.: 687,242

[22] Filed: Jul. 25, 1996

[51] Int. Cl.⁶ ................................................. G06F 12/12
[52] U.S. Cl. ........................................ 711/135; 711/143
[58] Field of Search ................................. 711/135, 138, 711/139, 143, 213, 133

[56] References Cited

U.S. PATENT DOCUMENTS

| | | | |
|---|---|---|---|
| 4,685,082 | 8/1987 | Cheung et al. | 365/49 |
| 5,097,409 | 3/1992 | Schwartz et al. | 711/145 |
| 5,414,827 | 5/1995 | Lin | 711/135 |
| 5,423,019 | 6/1995 | Lin | 711/135 |
| 5,469,555 | 11/1995 | Ghosh et al. | 711/133 |

*Primary Examiner*—Eddie P. Chan
*Assistant Examiner*—Kevin L. Ellis
*Attorney, Agent, or Firm*—LaValle D. Ptak

[57] ABSTRACT

A cache memory system operates without requiring valid bits in the external cache tag RAM by employing a system controller as a writeback cache controller for control of the cache data/tag memory and the system main memory. The system controller receives signaling information from a CPU through a host bus to indicate when to pre-load the cache memory or to flush (disable) the cache memory while maintaining memory coherencey by causing the cache controller to write back all modified lines in the cache memory to the main memory.

4 Claims, 3 Drawing Sheets

SYSTEM AND METHOD FOR ENABLING AND DISABLING WRITEBACK CACHE

BACKGROUND

In conjunction with efforts to reduce the size and improve the manufacturability of personal computers, chip sets have been designed for implementing direct mapped cache memories to improve the computer performance. Such cache memories employ small direct mapped high-speed static random access memories (SRAM), which permit the use of relatively slow and inexpensive dynamic random access memory (DRAM) for the large memory space. The cache memory effectively temporarily stores identical data located in the DRAM whenever a memory location is referenced at one point in time, and takes advantage of the property of operation of the computer that once a memory location has been addressed, it most likely is to be referenced again very soon after the initial addressing. As a result, the small high-speed SRAM cache memory essentially permits high-speed operation of the personal computer which would be unattainable if all addresses needed to be directed to the slower DRAM main memory.

Typically, a cache memory comprises two parts. The first of these parts is a high-speed data RAM and the second is a parallel high-speed tag RAM. In operation, the address of each line in the data cache ram is the same as the low order portion of the address to the main memory, to which any particular entry corresponds. The high order portion of the main memory address is stored in the tag cache RAM.

Traditionally, valid bits are used to mark cache entries as valid, especially in integrated cache controllers. This is done because it is necessary to determine whether the entries in the cache memory are valid, especially when the cache is first enabled. For a system controller IC containing an internal cache controller (including a tag comparator) for an external cache data/tag RAM, maintaining valid bits in the external cache RAM requires that one of the tag data bits between the tag RAM and the system controller is dedicated as a valid bit. This reduces the amount of cacheable main memory supported by the system, since the amount of cacheable main memory is dependent upon the width of the tag field.

In a system where the data cache memory is logically associated with the main memory (that is, all main memory accesses which hit the data cache memory are directed to the data cache memory instead of the main memory), the valid bits soon become irrelevant, since all the blocks in the cache memory become written with valid data. The need to later disable or re-enable the data cache memory occurs relatively infrequently in this system. As a result, the execution time needed to flush or re-initialize the data cache memory is not the primary concern, although automatic (hardware) methods may be required, since software procedures might not have access to a block of main memory equal to the size of the data cache; and other bus masters must be prevented from modifying the data cache memory after it has been flushed, but before it has been disabled.

Whenever a CPU (central processing unit) requests data from a memory in a system using the direct mapped cache memory, the tag for the selected cache entry is compared with the high order portion of the address from the CPU. If a match is obtained, the data from the cache data RAM is enabled onto the data bus. If, however, the tag does not match the CPU address, or if the tag data is invalid, the data is fetched from the main memory. Such data also then is placed in the cache for potential future use, overriding a previous entry in the cache memory.

Whenever a data write from the CPU is requested, either the cache RAM or the main memory, or both of them, are updated. Typically, flags are used to indicate such a writing of data from one memory to the other.

In some systems, the problem of requiring the extra valid bit is overcome by using a dedicated RAM chip with a "flush" pin. The flush pin then is connected to the system reset line to force the tag RAM to invalidate all its entries before the first instruction fetch by the CPU. A problem with such a system, however, is that dedicated tag RAM chips are expensive, and, therefore preferably avoided in most personal computer (PC) systems.

Another approach to solving the problem of employing the valid bits is to use a static RAM (SRAM). The SRAM then is powered up when the caching operation is disabled; and special routines are established in the set up program or in the driver to invalidate each cache tag entry before enabling the caching operation. This technique, however, generally requires additional special registers in the chip set, through which the accesses can be made. Specialized program set up codes also are necessary to accomplish the flush, which means that industry standard BIOS ROMs generally cannot be employed.

A system which was developed to overcome the disadvantages of the prior art systems mentioned above is disclosed in U.S. Pat. No. 5,414,827. The automatic cache flush system of the '827 patent operates to write permanently non-cacheable tags into a tag RAM with the entries corresponding to memory addresses being read while caching is disabled. In this system, even though no valid bit is cleared, erroneous cache hits, after caching is enabled, are automatically prevented, since addresses which do not match a tag in the tag RAM are non-cacheable addresses and force retrieval directly from main memory. The system extends this concept of permanently writing non-cacheable tags into the tag RAM beyond the power of cache flush to normal operation; so that the need for valid bits in the tag RAMS are eliminated.

It is desirable to provide a system which overcomes the disadvantages of the prior art mentioned above, which further functions without the requirement of permanently writing non-cacheable tags into the tag RAM, and which also eliminates the need for valid bits.

SUMMARY OF THE INVENTION

It is an object of this invention to provide a writeback cache memory system for a computer which maintains memory coherency without valid bits.

It is another object of this invention to provide a cache memory system for a computer which increases the amount of cacheable main memory supported.

It is another object of this invention to provide a method for enabling and disabling a writeback cache in a computer system without storing valid bits.

In accordance with a preferred embodiment of the invention, a cache memory system and method operates to disable the system controller for the cache at power on or system reset to prevent initial values of the cache tag RAM from causing false hits to the cache. After initialization of all lines in the cache, the cache controller relinquishes control of the CPU bus and enters normal operation. To flush the cache while maintaining memory coherency, the central processing unit (CPU) signals the cache controller to write back all modified lines. In response to a request to write back all modified lines, the cache controller requests and obtains mastership of the CPU bus and issues a series of memory read cycles to the cache memory, in the same manner as when pre-loading the cache. The cache controller, however, inhibits the main memory controller from responding to the memory read accesses during this operation; and each block which is found to be modified in the cache memory is written back to the main memory.

After all of the modified lines have been written back to the main memory, the cache controller relinquishes control of the CPU bus. If no auto-disable mode of operation is programmed in the system, the cache memory remains enabled for normal operation. If an auto-disable mode has been programmed into the system, however, the cache memory is automatically disabled prior to signaling the controller to flush the cache memory. The cache is re-enabled by performing the preload functions upon a signal from the CPU; so that the cache can repeatedly be enabled and disabled while preserving memory coherency.

DETAILED DESCRIPTION

Figure 1:
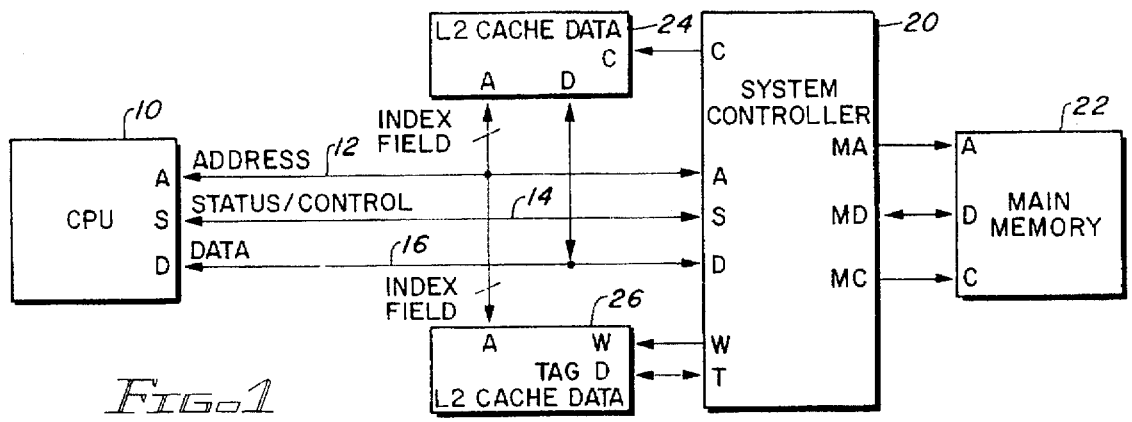
FIG. 1 is a block diagram of a system incorporating a preferred embodiment of the invention.

FIG. 1 is a simplified block diagram of a personal computer system incorporating a preferred embodiment of the invention. The system shown in FIG. 1 illustrates the operating environment of the system. As shown in FIG. 1, the system includes a central processing unit (CPU) 10 coupled to a CPU (host) bus, indicated by three separate leads 12, 14 and 16, respectively, labeled "Address", "Status/Control" and "Data". While the bus is shown in three parts in FIG. 1, it is to be understood that all three of the leads 12, 14 and 16 of FIG. 1 are portions of a single bus, and have been shown separately in FIG. 1 for purposes of separating the three different functions of signals carried on the bus. In FIG. 1, the pin identifications of various inputs and outputs on the different components are identified in accordance with the following table of pin abbreviations:

A=ADDRESS
S=STATUS/CONTROL
D=DATA
C=CONTROL
T=TAG
W=WRITE ENABLE
M=MEMORY

In the operation of the system, the host data bus 16 may include sizing information for the data (such as byte enables) The CPU 10 also must be capable of relinquishing control of the host bus 12, 14, 16 upon request of a system controller 20 also connected to the bus, or other bus masters (not shown), whenever the system controller 20 becomes a bus master. The system of FIG. 1 is particularly suited for operation with a CPU 10 in the form of a PENTIUM® (or compatable) microprocessor manufactured by Intel Corporation. The bus, consisting of the lines 12, 14, 16, typically is referred to as a local bus.

The system of FIG. 1 is operated with a cache memory identified as an L2 cache data memory 24 and an L2 cache tag memory 26, preferably in the form of a static random access memory (SRAM) The specific implementation of the tag RAM 26 is a standard asynchronous SRAM. The tag memory 26 is used to store tag information for each block to be stored in the cache data memory 24. Each tag has an associated modified bit which may be stored in either the tag memory 26 or the system controller 20. Alternatively, all tags are assumed to be modified if no modified bits are maintained in the system. The tag memory 26 is addressed by the index field of the CPU 10 over the address bus 12. The tag SRAM 26 also is written (w) by the system controller 20, as indicated in FIG. 1, and receives data from the tag field of the host address bus 12 through the system controller 20.

The cache data SRAM 24 is addressed by the index field of the host address bus 12 to store data for each block of data to be cached in the memory 24. Additional bits of the host bus (not shown) may be provided to select a word within the block if individual words can be addressed within a block (independent of the data sizing information). Data is supplied to and from the cache data RAM 24 over the data bus 16 from either the CPU 10 or the system controller 20, whichever one has control of the host bus comprising the portions 12, 14 and 16.

The system controller 20 also is interconnected with a main memory 22, which typically is a dynamic random access memory (DRAM). The various inputs for memory address, data, and control are indicated in the interconnections between the system controller 20 and the memory 22 of FIG. 1.

The system controller 20 includes an L2 cache data controller portion, shown as connected (c—c), to the memory 24, for providing control to the cache memory 24 and a main memory controller for the main memory 22. The cache controller is also shown by the connections (W—W) and (TAG D-T) for providing control and data for the tag RAM 26. The system controller 20 is capable of becoming a host bus master on behalf of the cache controller located within it, or for other agents (not shown) requesting access to the main memory 22. The system controller 20 receives signaling information from the CPU through the host bus 14 to indicate when to pre-load the cache memory 24/26, or to flush (disable) the cache memory 24/26. Some of this signaling information is implemented by standard mode registers residing in the system controller 20 which are configured by the CPU 10.

Figure 2:
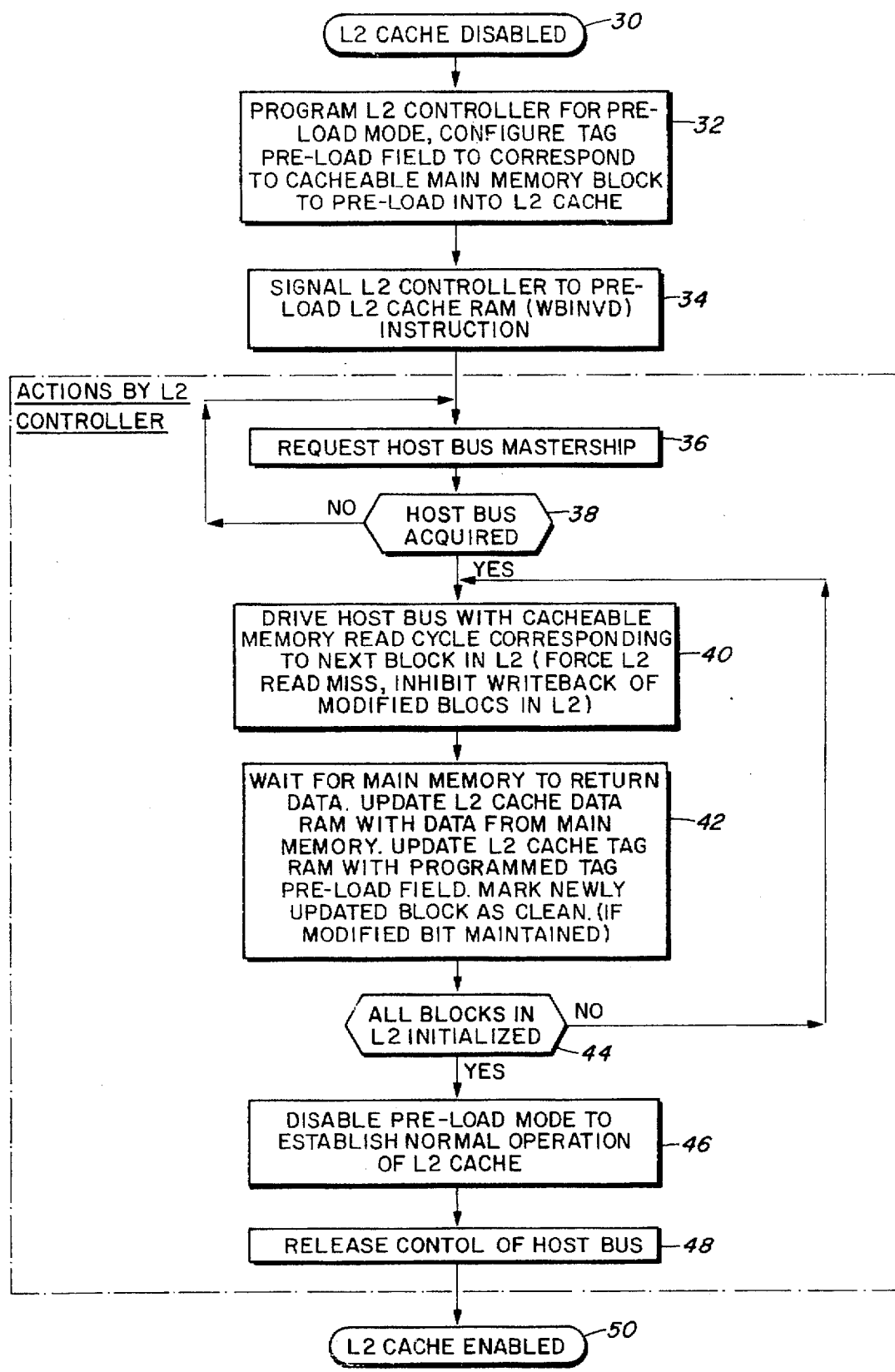
FIG. 2 is a flow chart of a portion of the operation of the system shown in FIG. 1.
Figure 3:
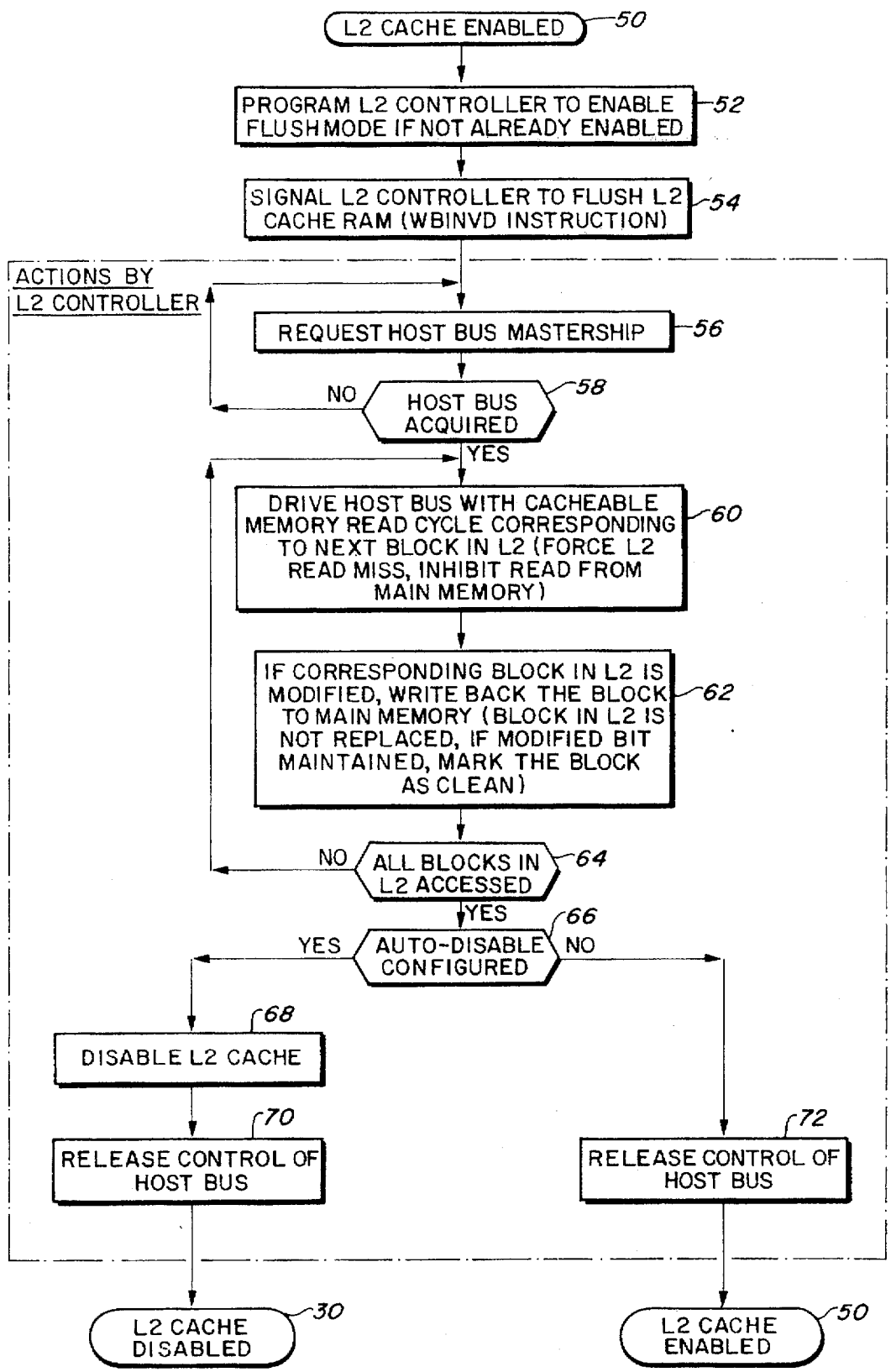
FIG. 3 is a continuation of the flow chart of the system operation of FIG. 2.

Reference now should be made to FIGS. 2 and 3, which constitute a flow chart of the operation of the system shown in FIG. 1. When the system of FIG. 1 first is powered up, the L2 cache data memory 24 is disabled, as illustrated in FIG. 2 at 30. This is done to prevent initial values of the cache tag RAM 26 from causing false hits to the cache memory 24. Following power up, the CPU 10 signals the system controller 20 to pre-load the entire L2 cache tag/data RAM, as indicated at 32. In this particular implementation, the CPU 10 first configures the controller 20 for cache pre-load, including the tag pre-load field which determines which block of the main memory 22 to pre-load from. The CPU 10 then signals the controller 20 to start the pre-load through a special writeback bus cycle, which is a writeback and invalidate cache 24 (WBINVD). This is accomplished by software through the WBINVD instruction at 34.

In response to the request from the CPU 10 to pre-load the entire L2 cache in the cache data memory 24, the cache controller 20 requests (at 36) and obtains mastership of the CPU bus 12, 14, 16 at 36. If host bus mastership is not required at 38, the request is repeated at 36, as shown in FIG. 2, until host bus mastership is acquired.

Operating as a CPU bus master, the cache system controller 20 issues a series of cacheable memory read cycles equal in number to the number of blocks which are supported by the L2 data cache memory 24. This is indicated in FIG. 2 at 40. The tag field of the memory addresses is determined by the pre-load field configured by the CPU 10, corresponding to a block of cacheable main memory equal in size to the size of the L2 cache data SRAM 24. The index field of the memory addresses is determined by a sequencer in the controller 20 to sequence through every line in the L2 cache. In this cache pre-load mode, the result of a tag match is ignored. Consequently, all memory reads miss the L2 cache memory 24. The L2 cache controller allows these cacheable memory read miss cycles to update the L2 cache tag SRAM 26 in the same manner as cacheable read miss cycles in normal operation, as indicated at 42 in FIG. 2, with the exception that L2 cache data replacement writebacks are inhibited.

At each block, the decision is made at 44 to determine whether all lines in the L2 cache 24 are initialized. If they are not, the sequence from 40 to 42 in FIG. 2 is repeated. Once all lines in the L2 cache are initialized at 44, the system controller 20 disables the pre-load mode of operation and establishes normal operation of the L2 cache data memory 24, as indicated at 46. Control of the CPU bus 12, 14 and 16 by the system controller 20 then is relinquished, and the system enters into normal operation as shown at 48. In this normal operation, the L2 cache data memory 24 is enabled at 50, with all blocks in the cache data memory 24 containing valid entries.

Reference now should be made to FIG. 3 for continuation of the operating sequence. With the L2 cache memory 24 enabled at 50, the CPU 10 signals the cache system controller 20 to write back all modified lines at 54. This causes the controller 20 to flush the L2 cache SRAM while still maintaining memory coherency.

As shown in FIG. 3, in response to the request from the CPU 10 to write back all modified lines, the system controller 20 requests mastership of the CPU bus 12, 14 and 16 at 56. This request continues until the host bus is acquired at 58. As the CPU bus master, the controller 20 issues a series of cacheable memory read cycles (forced to miss the L2 cache memory 24) at 60, just as it does when pre-loading the L2 cache memory 24, since L2 cache data replacement writebacks normally occur during cacheable memory read/ miss cycles, which must replace modified blocks in the L2 cache data memory 24. The cache system controller 20, however, inhibits the main memory controller in 20 from responding to the memory read accesses from the main memory 22, and the system controller 20 does not perform replacements of blocks in the L2 cache data memory 24. Instead, each block which is found to be modified is written back to the main memory 22, and the block is marked as clean, if a DIRTY bit is maintained for the block. This is indicated at 62 in FIG. 3. This operation continues at 64 until all of the blocks in the L2 cache data memory 24 have been accessed.

After all of the modified lines have been written back to the main memory 22, the L2 cache data memory 24 automatically is disabled at 66 if the CPU 10 has programmed an auto-disable mode in the system controller 20 prior to signaling the L2 cache data controller forming a part of the controller 20 to flush the L2 cache data memory 24. Thus, the L2 cache data memory 24 is disabled at 68; and this feature ensures that no other bus master can modify the data in the L2 cache memory 24 after it has been flushed, but before it could be disabled in software. Once the memory 24 has been disabled, the controller 20 releases control of the host bus 12, 14 and 16 at 70; and the original condition of the L2 cache data memory 24 being disabled in FIG. 2 at 30 results.

If the auto-disable configuration at 66 has not been programmed, the controller 20 relinquishes control of the CPU bus at 72, and the L2 cache data memory 24 remains enabled at 50. As a consequence, the L2 cache data operation may be repeatedly enabled and disabled while preserving memory coherency; and the system operation may be repeated from either block 30 or block 50 in accordance with the configuration of the auto-disable function at 66.

Figure 4:
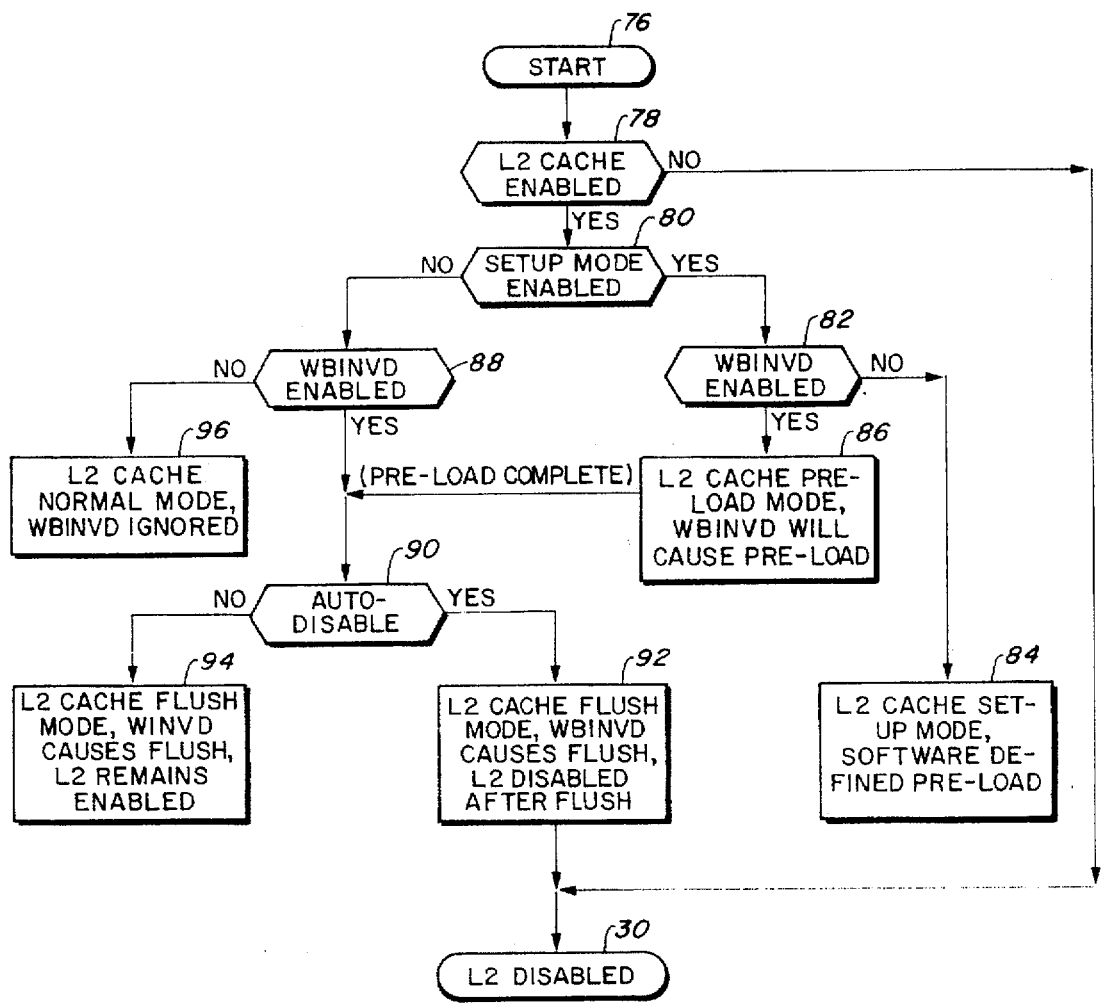
FIG. 4 is a flow chart summary of the various operating modes of the system shown in FIG. 1.

FIG. 4 is a flow diagram which operates as a summary of the controller 20 for the L2 cache controller operating modes. As shown in FIG. 4, at start 76 a determination is made at 78 as to whether the L2 cache 24 is enabled. If not, the status of the L2 cache being disabled at 30 exists, as shown at the bottom of FIG. 4. If the cache 24, however, is enabled at 78, the next inquiry is whether the set up mode is enabled at 80. If this set up mode is enabled, a determination is made at 82 as to whether the writeback invalid (WBINV) is enabled. If it is not, the L2 cache is operated in the set up mode, with the software defined pre-load at 84.

If WBINVD is enabled at 82, the L2 cache memory pre-load mode is operated and WBINVD will cause the pre-load of the cache memory 24, as shown at 86 in FIG. 4. When this pre-load is completed, the auto-disable determination is made at 90. If the auto-disable configuration is used, the system controller 20 is operated in the flush mode at 92 with WBINV causing the flush, after which the L2 cache memory 24 and tag 26 is disabled, shown in FIG. 4 as block 30, once again setting the system up for the sequence of operation shown in FIG. 2. If the auto-disable is not configured at 90, the L2 cache flush mode is operated at 94 with WBINVD causing the flush the L2 cache and the L2 cache remains enabled, as shown in block 50 of FIG. 3.

At the time of the determination of the set up mode at 80, if the set up mode is not enabled, the next determination is whether or not the WBINVD is enabled at 88. If WBINVD is not enabled, the L2 cache memory 24 and tag memory 26 are operated in a normal mode at 96, with WBINVD ignored. It should be noted that the decisions made at blocks 78, 80, 82 and 88 each represent stored configuration bits in the system; so that the particular track followed by the operation of the system in FIG. 4 is determined by these configuration bits. Also, as shown in FIG. 4, blocks 30, 84, 86, 92, 94 and 96 all are modes of operation of the controller 20.

The system which has been described above in conjunction with a preferred embodiment of the invention does not require maintenance of valid bits in the external tag SRAM memory 26; so that the address range of main memory elible to be stored in the cache SRAM memory 24 is increased over systems which require retention of such valid bits. It also should be noted that the system, through the operation shown in FIG. 3, maintains coherence between the information in the cache memory 24 and that stored in the main memory 22 by ensuring rewriting of data into the main memory at block 62 of FIG. 3. In a system of the type described above where the L2 cache data in the memory 24 is logically associated with the main memory 22, i.e. where all main memory accesses which hit the cache data memory 24 are directed to the cache 24 instead of the main memory 22, valid bits soon become irrelevant, since all of the blocks in the cache memory 24 become written with valid data. The manner in which this is done is described in conjunction with the flow diagrams of FIGS. 2 and 3. The need later to disable and then re-enable the L2 cache 24/26 occurs relatively infrequently in an actual system operation; so that the execution time needed to flush and re-initialize the cache 24/26 is not a primary concern.

The foregoing description of the preferred embodiment of the invention is to be considered as illustrative and not as limiting. Various changes and modifications will occur to those skilled in the art for performing substantially the same function, in substantially the same way, to achieve substantially the same result without departing from the true scope of the invention as defined in the appended claims.

What is claimed is:

1. A method for controlling a cache memory in a computer system having a central processing unit (CPU), a host bus, a system controller, a main memory and a cache memory having a data portion and a tag portion including the steps of:

disabling said cache memory on power on and system reset to prevent initial values of the tag portion of said cache memory from causing false hits to the data portion of said cache memory;

pre-loading said cache memory data portion and tag portion in response to signals from said CPU which configure said system controller to determine from which block of main memory said cache memory is to be pre-loaded;

relinquishing control of the host bus by the system controller after initializing the cache memory;

signaling said system controller from said CPU to flush said cache memory for writing data therefrom back to said main memory;

driving the host bus with cacheable memory read cycles corresponding to the next block in said cache memory; and writing back blocks to said main memory if the corresponding block in said cache memory is modified until all blocks in said cache memory are accessed; and releasing control of said host bus by said system controller to said CPU.

2. A method for operating a cache memory having a data portion and a tag portion in a system including a CPU, a host bus, a system controller, and a main memory, including the steps of:

providing control of said host bus to said CPU with said cache memory enabled;

signaling said system controller over said host bus by said CPU for initiating flush of said cache memory to write data back to said main memory;

acquiring mastership of said host bus by said system controller;

driving said host bus with a cacheable memory read cycle corresponding to the next block of data in said cache memory;

writing modified blocks in said cache memory back to said main memory until all blocks in said cache memory are accessed; and releasing control of said host bus by said system controller to said CPU such that tag-valid bits for each entry of said cache memory are not required.

3. A system for controlling a cache memory including in combination:

central processing unit (CPU);

a system memory controller;

a host bus interconnecting said CPU and said system memory controller;

a main memory coupled with said system memory controller;

a cache data/tag memory coupled with said host bus and driving said host bus by said system memory controller during power on and system reset to pre-load said cache data/tag memory with blocks of information from said main memory while inhibiting writebacks of modified blocks in said cache data/tag memory to said main memory and;

means for disabling said system memory controller and releasing control of said host bus to said CPU upon completion of initialization of all blocks of information in said cache memory; and wherein said CPU subsequently programs said system memory controller for a flush mode of operation with said system controller acquiring control of said host bus and driving said host bus with cacheable memory read cycle to write back blocks of information from said cache memory to said main memory until all blocks of memory in said cache memory are accessed.

4. The combination according to claim 3 further including means for automatically disabling said cache memory after writing blocks back to said main memory to release control of said host bus to said CPU.

* * * * *